United States Patent
Jadidian et al.

(10) Patent No.: US 12,411,229 B2
(45) Date of Patent: Sep. 9, 2025

(54) SYNTHETIC APERTURE RADAR FOR HEAD MOUNTED DISPLAYS

(71) Applicant: MICROSOFT TECHNOLOGY LICENSING, LLC, Redmond, WA (US)

(72) Inventors: Jouya Jadidian, Los Gatos, CA (US); Ping Liu, Bothell, WA (US); Scott Francis Fullam, Palo Alto, CA (US); Rubén Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 17/518,422

(22) Filed: Nov. 3, 2021

(65) Prior Publication Data
US 2023/0136270 A1    May 4, 2023

(51) Int. Cl.
*G01S 13/90* (2006.01)
*G02B 27/01* (2006.01)

(52) U.S. Cl.
CPC .......... *G01S 13/90* (2013.01); *G02B 27/0172* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 10,690,760 B2 * | 6/2020 | Melamed | G06T 7/50 |
| 2006/0066469 A1 | 3/2006 | Foote et al. | |
| 2017/0097413 A1 * | 4/2017 | Gillian | G06F 21/6245 |
| 2021/0156987 A1 * | 5/2021 | Hwang | G01S 13/583 |
| 2021/0278523 A1 * | 9/2021 | Urtasun | G01S 13/865 |

FOREIGN PATENT DOCUMENTS

EP    3552041 A2    10/2019

OTHER PUBLICATIONS

"International Search Report and Written Opinion Issued in PCT Application No. PCT/US22/041768", Mailed Date: Dec. 13, 2022, 12 Pages. (MS# 410631-WO-PCT).

* cited by examiner

Primary Examiner — Vladimir Magloire
Assistant Examiner — Brandon James Henson
(74) Attorney, Agent, or Firm — Jens Christopher Jenkins

(57) ABSTRACT

Systems and methods are provided for using a user wearable device having a first radar array configured to perform elevation mapping of a three-dimensional environment and a second radar array configured to perform azimuthal mapping of the three-dimensional environment which is divided into a plurality of voxels. Based on a detected triggering condition of the radar arrays, systems and methods are provided for dynamically updating at least a sub-set of voxels of the plurality of voxels in the three-dimensional environment at a new voxel granularity configured to facilitate an improvement in a resolution of one or more features included in the three-dimensional environment.

19 Claims, 14 Drawing Sheets

SYNTHETIC APERTURE RADAR FOR HEAD MOUNTED DISPLAYS

BACKGROUND

Mixed-reality systems, such as virtual reality systems and augmented reality systems have received significant attention because of their ability to create unique experiences for their users. Virtual reality systems provide experiences in which a user is fully immersed in a virtually represented world, typically through a virtual reality headset or head-mounted device (HMD) that prevents the user from seeing objects located in the user's real environment. Augmented reality systems provide a user with experiences that allow the user to interact with both virtual content and real objects located in the user's environment. For example, virtual objects are virtually presented to the user within the user's own real environment such that the user is able to perceive the virtual objects in relation to physical or real objects.

Typically, users perceive or view the virtual reality or augmented reality through an enclosed visual display (for virtual reality) or transparent lens (for augmented reality). Users can then interact with the perceived reality through different user input controls, as located on a user controller, or set of user controllers.

In order for the user to interact well within the mixed-reality, the mixed-reality system must be able to map the environment in which the user is operating the mixed-reality system. This is important so that as a user moves through the virtually displayed world, the user does not come into contact with physical barriers that exist in the user's actual environment.

There are different techniques for mapping a user's location within an environment, such as visual tracking systems, GPS satellite tracking systems and various other types of tracking systems. Some systems, for example, are configured to utilize inertial movement unit (IMU) sensor data from localized accelerometers and other tracking components that are configured to track movements of a device within a mapped environment.

Unfortunately, many existing methods and systems for tracking movements of devices within mapped environments, as well as for performing the initial mapping of the environments, are somewhat inflexible in the manner in which they perform their tracking and mapping processes. In particular, some systems are not configured to flexibly accommodate their processes to accommodate for different types of environments in which they are used. Even more particularly, some systems perform the same types of tracking/mapping processes, regardless of environmental conditions that can sometimes result in degraded mapping and tracking performance.

By way of example, some mapping and tracking devices rely on visual tracking that is not conducive for all types of environments. In particular, many visual tracking systems rely on line-of-sight and require sufficient illumination within the environment that is being mapped. Unfortunately, some environments are too dark and/or obscured to facilitate competent mapping and tracking with existing visual tracking systems. Other dynamic conditions associated with relative movements of the tracking devices and objects in the environment can also degrade mapping and/or tracking processes with existing systems.

Accordingly, there is an ongoing need and desire for improved systems, methods, and devices for performing mapping of environments and for tracking device movements within those environments, and particularly, for improved systems, methods, and devices that can be utilized for dynamically and flexibly adjusting the processing being employed for mapping environments and for tracking devices in different types of environmental conditions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices that include and/or that are configured to facilitate the virtual mapping of three-dimensional environments and, in some instances, for tracking movements of devices in mapped environments.

Some disclosed systems include a computing system configured to map a three-dimensional environment into a plurality of voxels according to a default voxel granularity. Systems then detect a triggering condition configured to cause the computing system to dynamically modify the default voxel granularity used to map the three-dimensional environment. Based on the triggering condition, systems dynamically update at least a sub-set of voxels of the plurality of voxels in the three-dimensional environment at a new voxel granularity which is configured to facilitate an improvement in a resolution of one or more features included in the three-dimensional environment.

A set of signal waveforms to be transmitted by one or more transmitters is selected. For each voxel of the sub-set of voxels and each signal waveform of the set of signal waveforms, a received signal waveform is computed. The received signal waveform is initially transmitted by at least one transmitter and subsequently received by the one or more receivers after being reflected back from a reflector simulated to be located within at least one voxel included in the sub-set of voxels. Finally, based on a plurality of received signal waveforms associated with each voxel and signal waveform combination, the systems generate one or more two-dimensional maps that represent one or more cross-sections of the three-dimensional environment.

Disclosed systems also include various embodiments which incorporate or utilize a user wearable device comprising a first radar array configured to perform elevation mapping of a three-dimensional environment and a second radar array configured to perform azimuthal mapping of the three-dimensional environment. Each radar array comprises one or more transmitters configured to transmit a signal and one or more receivers configured to receive the signal transmitted by the one or more transmitters and reflected back from a real or simulated feature of the three-dimensional environment.

Additional embodiments include using the wearable device to perform processes for tracking movements and positioning of the user wearable device within the three-dimensional environments in which the wearable device is used.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
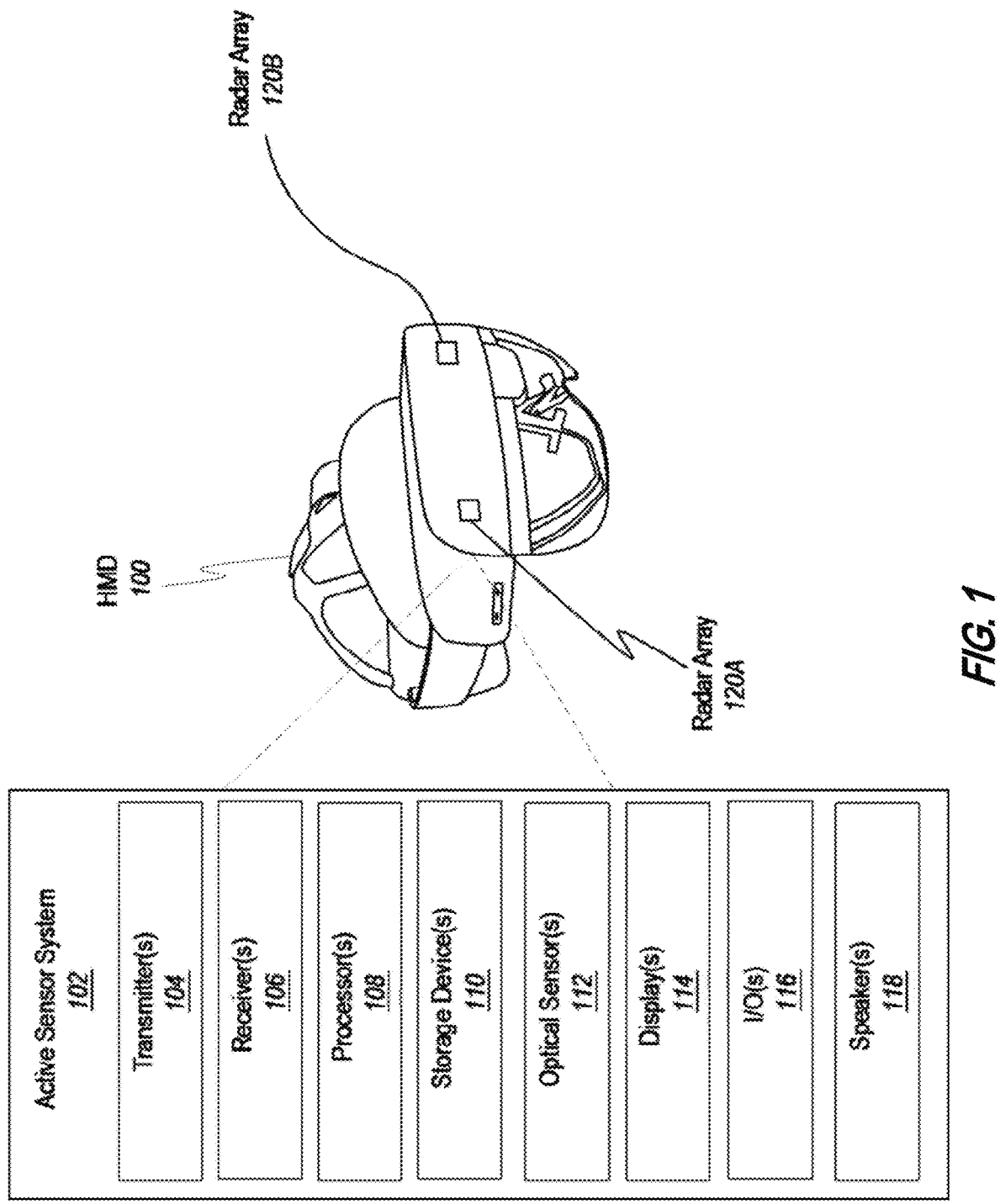
FIG. 1 illustrates an active sensor system that includes and/or that is capable of being utilized to implement the disclosed embodiments.

Embodiments disclosed herein relate to systems, methods, and devices that are configured to facilitate virtual mapping of a three-dimensional environment using progressive synthetic aperture radar systems and methods.

The disclosed embodiments provide many technical advantages over existing systems, methods, and devices. For example, the disclosed embodiments provide for progressive synthetic aperture radar use which allows an active sensor system to virtually map a physical three-dimensional environment at varying resolutions. The reflectivity data and mapping data that is collected can help augment head tracking and other tracking processes.

Disclosed embodiments improve a user's experience while interacting with a virtual reality and/or augmented reality system in a particular environment. The virtually mapping can be adapted to board-locked avatar visualizations as well as world-locked visualizations.

Furthermore, an active sensor system comprising radar arrays as described herein are usable in dark environments or environments that have little to no visual features. In such environments, the active sensor system is still able to identify and track environment boundaries such as walls and/or the ground and identify and track landmarks (e.g., objects in the environment) as anchor points. These anchor points are beneficial in improving the accuracy of head tracking as well as user controller tracking.

Furthermore, the active sensor system is able to function on low power while still meeting signal transmission requirements.

The design of the active controller system is relatively inexpensive and highly customizable in terms of the range of operation, the size of the active sensor system, and the frequency of the signal being transmitted by the active sensor system. Beneficially, in use applications for mixed-reality systems, the active sensor system is designable as various embodiments of a head-mounted device.

FIG. 11 illustrates an exemplary active sensor system 102 that includes and/or that is capable of being utilized to implement the disclosed embodiments. The active sensor system 102, depicted in FIG. 1 as a head-mounted device (e.g., HMD 100), includes a plurality of radar arrays (e.g., radar array 120A and radar array 120B). Each radar array comprises one or more transmitters 104 and a plurality of receivers 106.

The active sensor system 102 is also illustrated as including one or more processor(s) (such as one or more hardware processor(s) 108 and a storage (i.e., storage device(s) 110) storing computer-readable instructions wherein one or more of the hardware storage device(s) 110 is able to house any number of data types and any number of computer-readable instructions by which the active sensor system 102 is configured to implement one or more aspects of the disclosed embodiments when the computer-readable instructions are executed by the one or more processor(s) 108. The active sensor system 102 is also shown including optical sensor(s) 112, display(s) 114, input/output (I/O) device(s) 116, and speaker(s) 118.

In such alternative embodiments, for example, the system can dynamically detect interference, based on analyzing sensor data received at the system and/or based on user input or third-party input, and can responsively activate and/or use IMU sensor data from the IMU, if one is provided, to perform active head tracking which helps to facilitate an accurate tracking and predictive tracking of the radar array trajectory.

The head-mounted device is used to determine the reflectivity of a particular voxel based on a signal generated from and reflected back to the active sensor system by the reflector simulated to be located within the particular voxel. The active sensor system is contained within a headset (e.g., HMD 100) that is configured to be worn by a user, such that the active sensor system 102 is configured to virtually map a user's three-dimensional environment.

The reflected signal is detected and tracked via a computing system which is in communication with the active sensor system 102. In some embodiments, the HMD 100 includes a display showing the virtually created map of the user's physical environment. In other instances, a computing system is integrated with the active sensor system 102 within the HMD 100.

Figure 2:
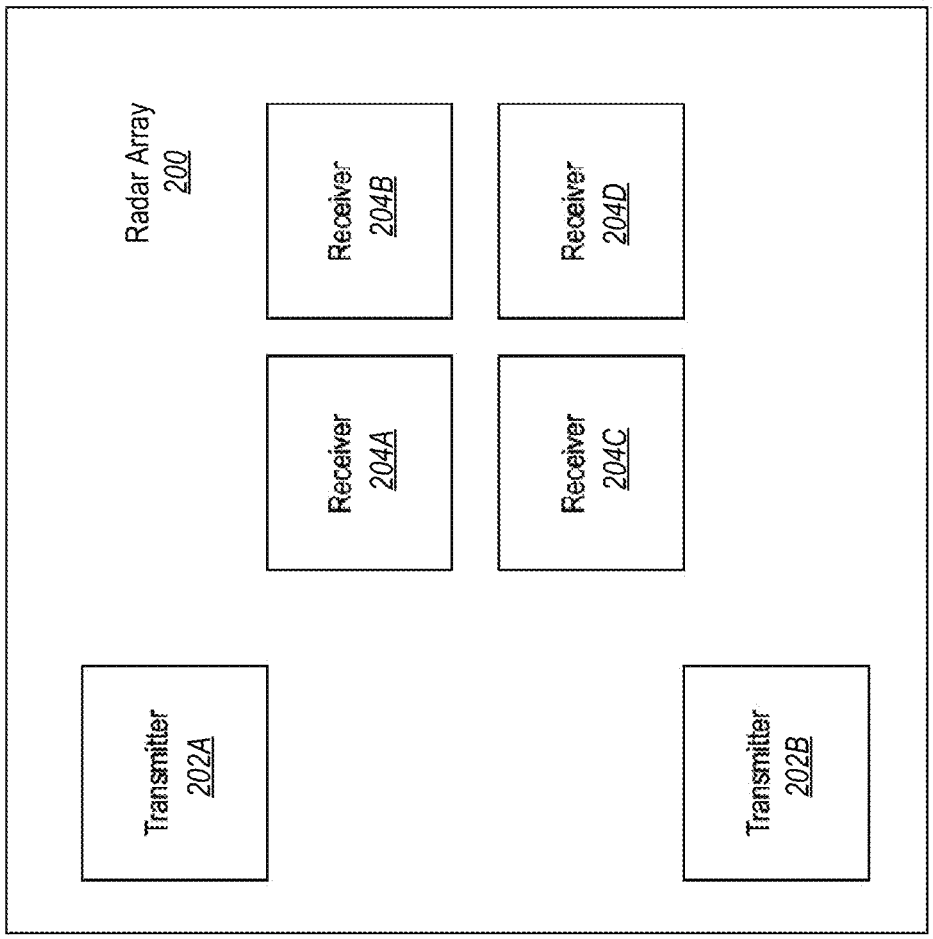
FIG. 2 illustrates an example embodiment of a radar array as included in an active sensor system as shown in FIG. 1.

FIG. 2 illustrates an example embodiment of a radar array 200 as included in an active sensor system as shown in FIG. 1. FIG. 2 illustrates an example embodiment of a radar array 200 having a plurality of transmitters and a plurality of receivers. The radar array 200 is configured to virtually map a three-dimensional space in which a user is using the active sensor system. The radar array 200 comprises one or more monostatic transmitters (e.g., transmitter 202A and/or transmitter 202B) and is configured to transmit one or more signals within a particular range and at a variety of signal frequencies.

The radar array 200 also comprises one or more monostatic receivers (e.g., receiver 204A, receiver 204B, receiver 204C, and/or receiver 204D) configured to receive one or more signals reflected from a plurality of simulated reflectors that are virtually simulated within the user's physical three-dimensional environment, the plurality of simulated reflectors being configured to reflect the one or more signals to the one or more monostatic receivers.

As shown in FIG. 2, the one or more monostatic transmitters and one or more monostatic receivers are fixedly positioned with respect to each other in a particular orientation. The plurality of receivers is beneficially configured in a square orientation such that the radar array is able to resolve objects included in the three-dimensional environment in both the azimuth direction and elevation direction. This is also beneficial because the radar array is typically moved through a non-linear trajectory according to different head movements of the user. It should be appreciated that while shown as a head-mounted device in various figures, the active sensor system (and/or individual radar arrays are mountable to other devices that facilitate the radar array movement within the three-dimensional environment, see FIG. 14).

In some instances, each receiver comprises a signal reception field of view (FOV) of about 54 degrees (although the FOV can also be more or less than 54 degrees). In this manner, the use and arrangement of a plurality of receivers is able to cover a FOV of at least 90 degrees, and even more preferably, a FOV of about or at least 180 degrees. In some instances, the plurality of receivers comprises a FOV that is equivalent to the signal transmission area. In some instances, the FOV is larger or greater than the signal transmission area. The plurality of receivers acts to increase the FOV and effective aperture of the radar array. For example, with three radars each at a half wavelength distance apart, the total aperture is up to a single wavelength.

In the current embodiment, the active sensor system of FIG. 2 is configured as a monostatic radar. In this monostatic radar configuration, each receiver is independent of the other receivers, such that the signals being received are processed incoherently. Furthermore, the receiver and transmitter share an antenna. However, in some instances, the active sensor system is configured as a bistatic or multi-static radar. A multi-static radar comprises multiple spatially diverse monostatic or bistatic radar components with a shared area of coverage or FOV.

In some instances, each transmitter in the active sensor system is configurable to sweep frequencies from a low end to a high end within a predetermined range of frequencies that is based on the size of the voxel granularity and predetermined distance between the active sensor system and the simulated reflectors. These parameters also determine the power consumption of the active sensor system. The disclosed embodiments herein beneficially provide a low power active sensor system. Furthermore, active sensor system is also configured to perform the tracking algorithms which process the simulated reflected signals that are received by the one or more receivers.

The receivers are preferably disposed at a distance comprising a half-wavelength of the signal being transmitted. In some instances, the receivers are disposed at this half-wavelength distance in two dimensions. Additionally, the transmitters are disposed at a distance comprising a wavelength of the signal being transmitted. This spacing between the receivers and transmitters is beneficial to reduce or avoid potential aliasing of the received signals being reflected from a particular voxel.

Figure 3:
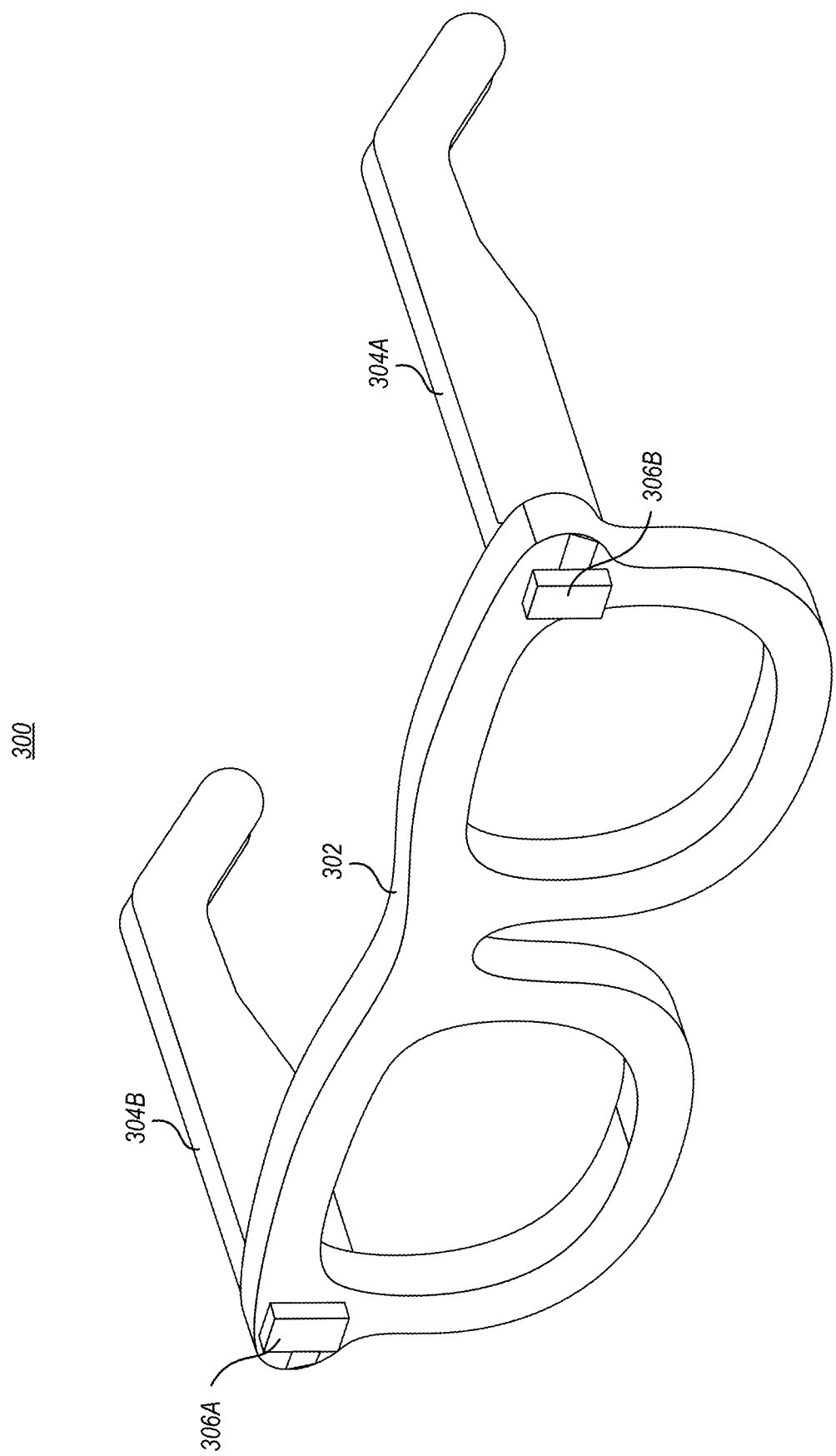
FIG. 3 illustrates an example embodiment for a head-mounted device including a plurality of radar arrays, for example radar arrays as shown as in FIG. 2.

Attention will now be directed to FIG. 3, which illustrates an example embodiment for a head-mounted device including a plurality of radar arrays, for example radar arrays as shown as in FIG. 2. As illustrated, the head-mounted device is configured as pair of mixed-reality glasses 300 having a front lens frame 302, a left ear temple 304A, and a right ear temple 304B. A plurality of radar arrays (e.g., radar array 306A and radar array 306B) are mounted on the front lens frame 302. Radar array 306A is attached to a front portion of the front lens frame 302 near the right ear temple 304B. Radar array 306B is attached to a different front portion of the front lens frame 302 near the left ear temple 304A.

The mixed-reality glasses 300 are configured to be worn by users, wherein users are able to move their heads in an omni-directional manner such that the radar arrays are able to transmit a signal and receive a signal reflected from a simulated reflector in order to map the three-dimensional environment in which the user wishes to use the mixed-reality glasses.

Notwithstanding the previous examples, it will also be noted that the radar assemblies/components described herein can also be incorporated into other wearable structures and products other than glasses or headsets. In some instances, any combination of the referenced radar assemblies and associated components that are described herein are incorporated into handheld mapping guns (not presently shown) and/or other wearable or handheld devices (not presently shown) other than glasses or HMD devices.

Figure 4:
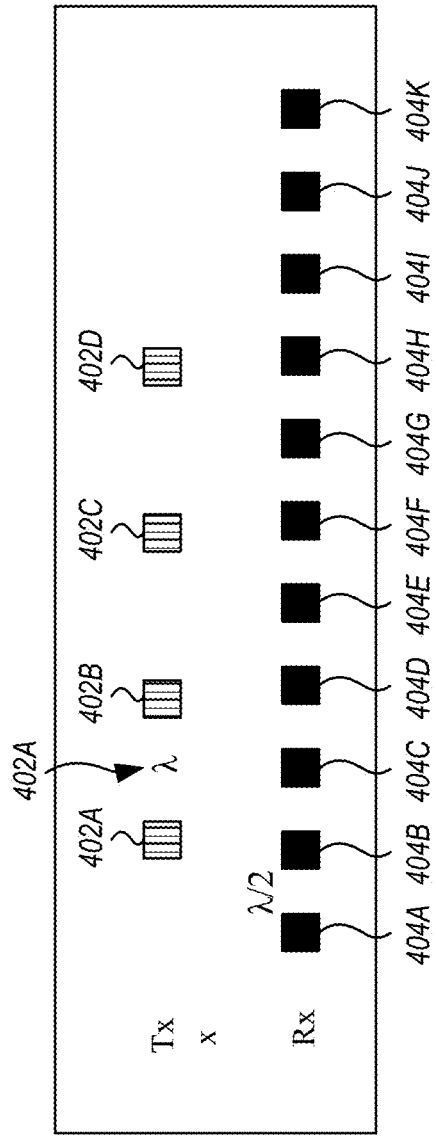
FIG. 4 illustrates an alternate example embodiment of a radar array.

Attention will now be directed to FIG. 4, which illustrates an alternate example embodiment of a radar array. In alternative embodiments, the receivers and transmitters are positioned into different configurations on the active sensor system relative to each other and/or include different quantities of transmitters (e.g., 1, 3, 4, or more than 4) and/or different quantities of receivers (e.g., 1, 2, 3, 5, or more than 5). In yet other alternative embodiments, one or more of the transmitters and/or receivers are distributed between different devices of the active sensor system (e.g., a HMD, wired peripheral, remote beacon, remote transceiver and/or other sensor system(s)).

As illustrated in FIG. 4, radar array 400 is shown having a plurality of transmitters (e.g., transmitter 402A, transmitter 402B, transmitter 402C, and transmitter 402D) which are separated by a single wavelength of the signal to be transmitted by each of the plurality of transmitters. In some instances, the plurality of transmitters is disposed in a linear configuration. Radar array 400 is also shown having a plurality of receivers (e.g., receiver 404A, receiver 404B, receiver 404C, receiver 404D, receiver 404E, receiver 404F, receiver 404G, receiver 404H, receiver 404I, receiver 404J, and receiver 404K. In some instances, the plurality of receivers is disposed in a linear configuration.

Figure 5:
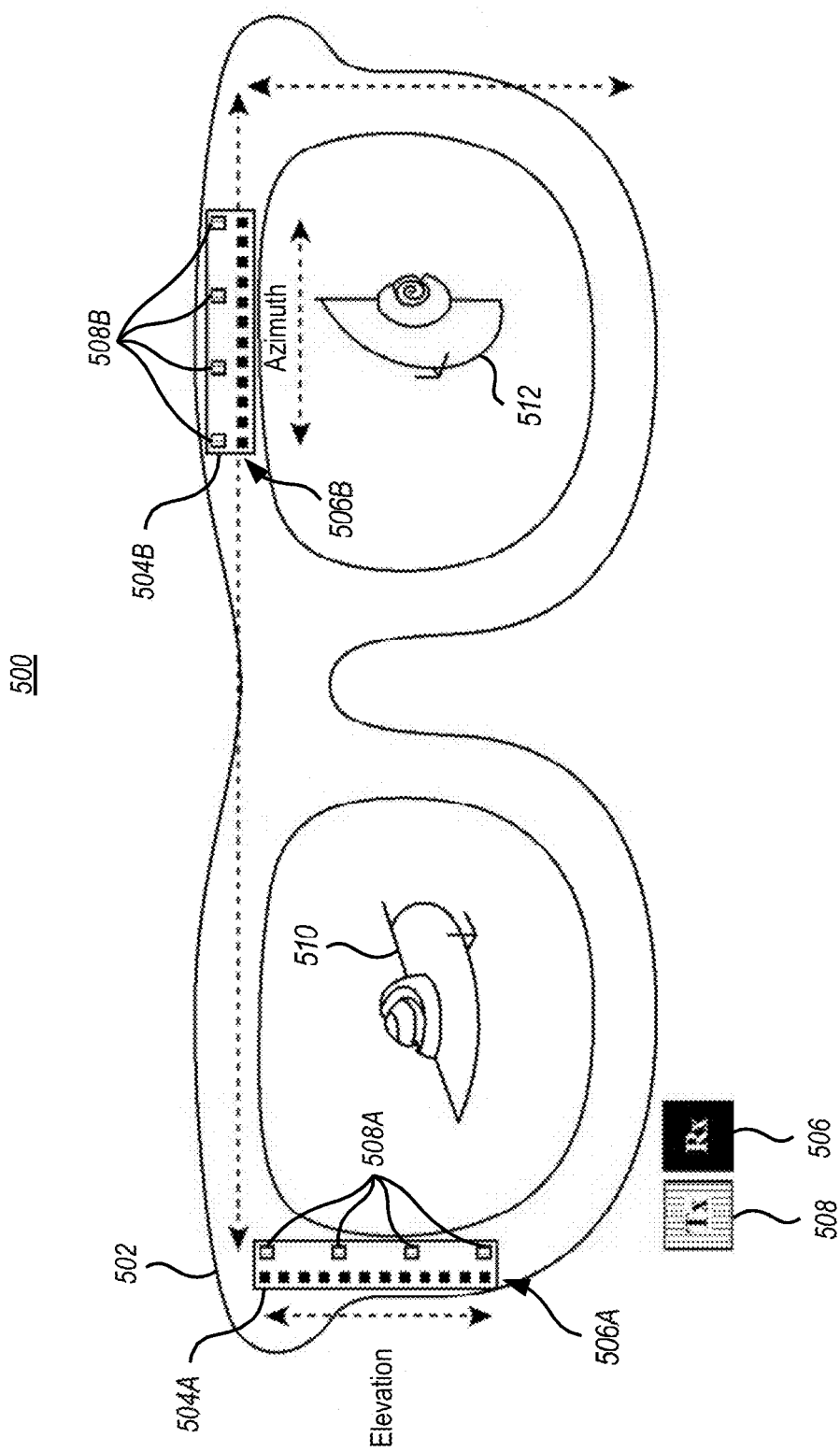
FIG. 5 illustrates an alternate example embodiment for a head-mounted device including a plurality of radar arrays, for example radar arrays as shown in FIG. 4.

Attention will now be directed to FIG. 5, which illustrates an alternate example embodiment for a head-mounted device 500 including a plurality of radar arrays, for example radar arrays as shown in FIG. 5 having transmitters (e.g., transmitter 508) and receivers (e.g., receiver 506). Head-mounted device 500 is configured as a set of mixed-reality glasses, shown having a front lens frame 502, and a plurality of radar arrays. Each radar array is mounted to the head-mounted device 500 such that each radar array is able to map a user's environment in particular direction.

In radar array configurations, such as shown in FIG. 4, each radar array is only able to resolve objects within the user's environment (i.e., map the user's environment) in a single direction (e.g., azimuth or elevation). For example, the elevation direction radar array 504A is shown having a plurality of receivers 506A and a plurality of transmitters 508A which are disposed in a vertical linear configuration relative to the front lens frame 502.

The elevation direction radar array 504A is configured to sweep along a horizontal axis represented by cross-section 510 of the user's environment. Additionally, the azimuth direction radar array 504B is shown having a plurality of receivers 506B and a plurality of transmitters 508B which are disposed in a horizontal linear configuration relative to the front lens frame 502. The azimuth direction radar array 504B is configured to sweep along a vertical axis represented by cross-section 512 of the user's environment.

Figure 6:
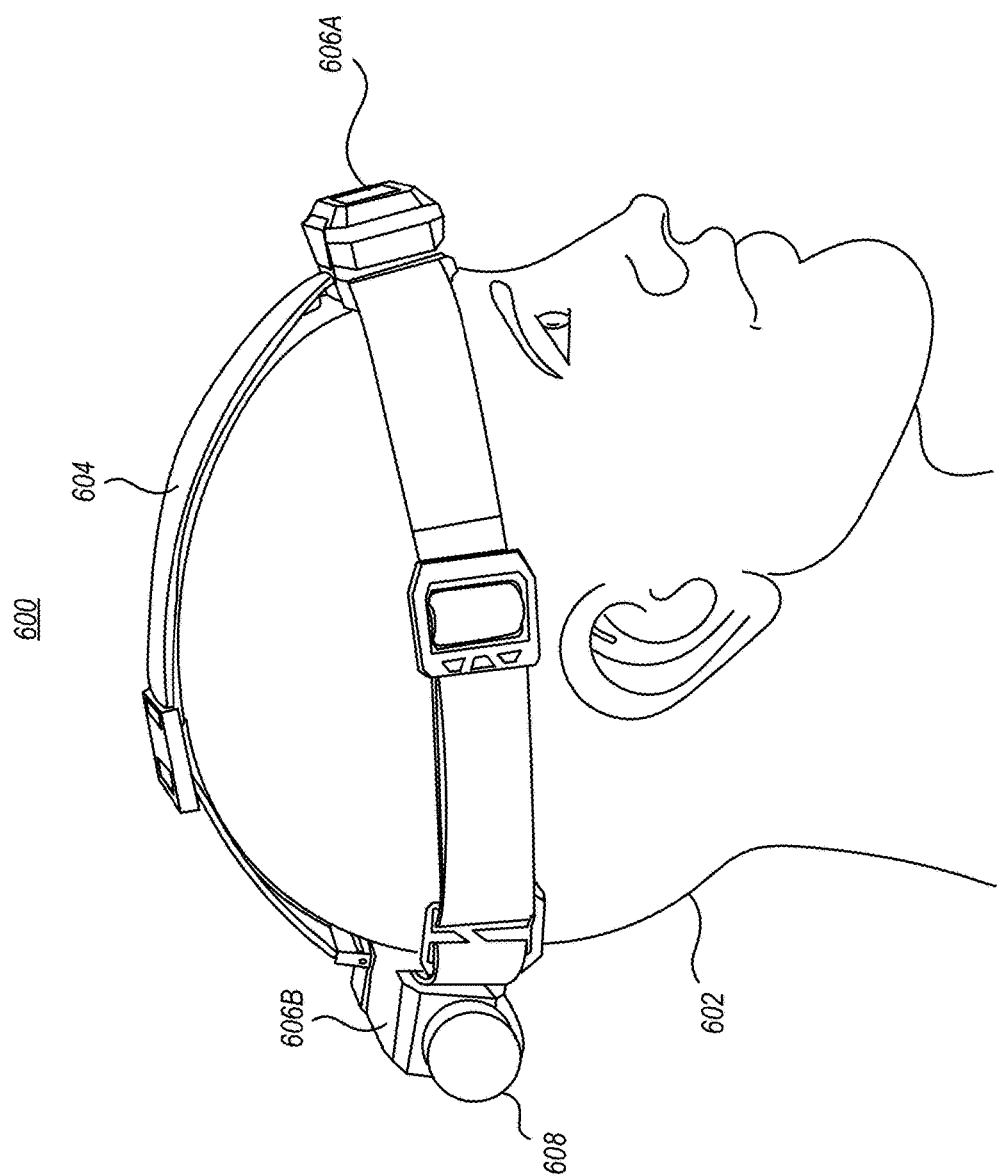
FIG. 6 illustrates an active sensor system configured as an alternate embodiment of a head-mounted device having a plurality of radar arrays.

Attention will now be directed to FIG. 6, which illustrates an active sensor system 600 configured as an alternate embodiment of a head-mounted device 604 having a plurality of radar arrays. For example, head-mounted device 604 is configured as a plurality of adjustable straps connected in a manner to removably secure the active sensor system 600 to top portion of a user's head 602. The active sensor system 600 comprises a front radar array 606A and a back radar array 606B such that as users move their heads around in a linear and non-linear manner, up to 360 degrees of the user's environment is mapped simultaneously in one or more directions (e.g., azimuth, elevation, etc.). In some instances, active sensor system 600 includes a plurality of front radar arrays and a plurality of back radar arrays. Alternatively, or additionally, active sensor system 600 includes one or more side radar arrays disposed along a left-side strap, a right-side strap, or one or more top radar arrays disposed along a top strap. Active sensor system 600 is also shown having additional components such as battery power, processors, etc. (e.g., component 608).

Figure 7:
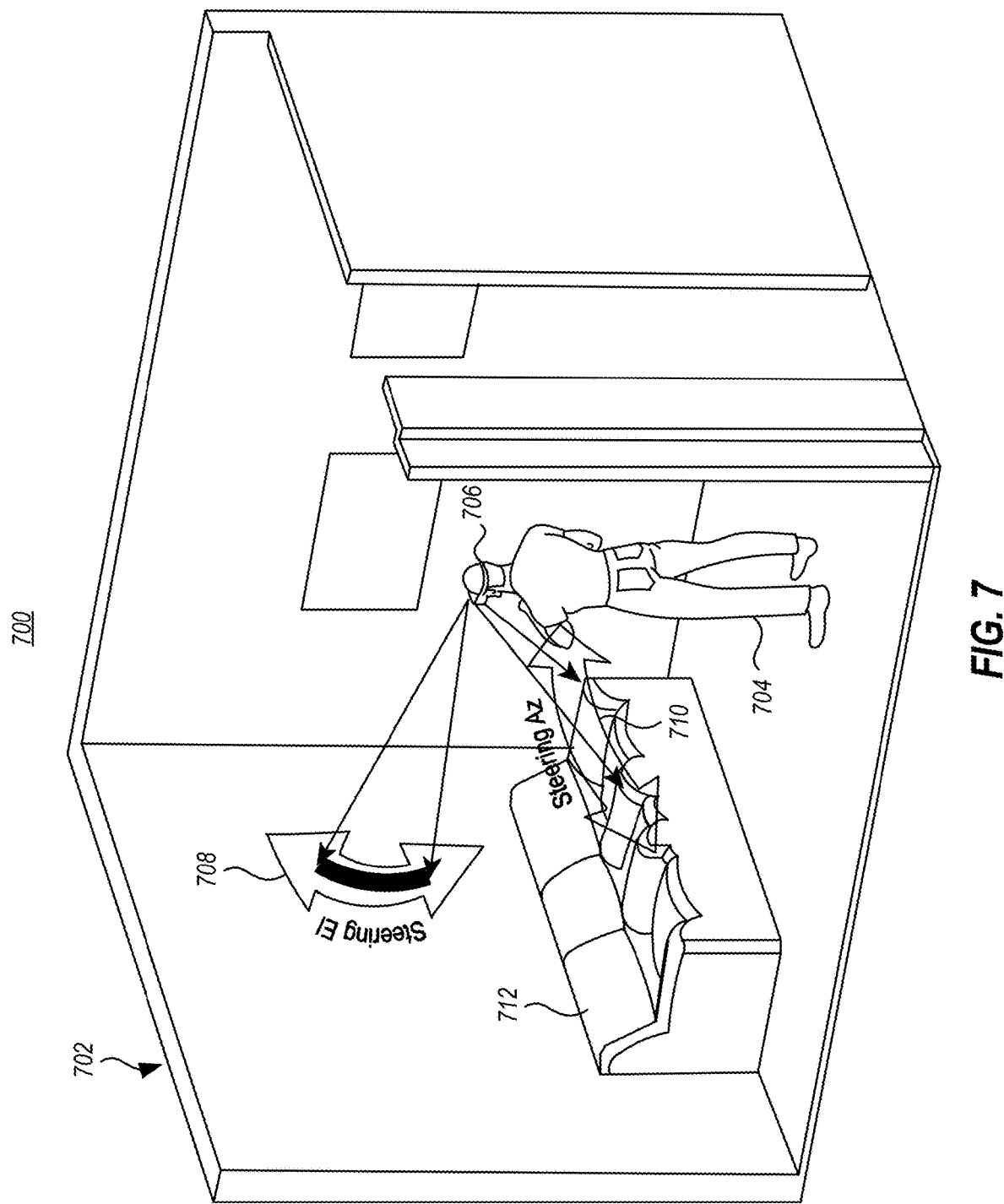
FIG. 7 illustrates an example embodiment of a user operating a mixed-reality system having an active sensor system, for example an active sensor system as shown in FIG. 1, wherein the user is able to use the mixed-reality system to map the user's three-dimensional environment.

Attention will now be directed to FIG. 7, which illustrates an example embodiment of a user 704 operating a mixed-reality system 700 having an active sensor system 706, for example an active sensor system as shown in FIG. 1, wherein the user 704 is able to use the mixed-reality system 700 to map the three-dimensional environment 702. The three-dimensional environment 702 is shown as an indoor living room space having a plurality of walls and a ground floor upon which the user stands vertically. Three-dimensional environment 702 further includes one or more stationary objects (e.g., couch 712). As the user moves his head in various linear and non-linear directions, the active sensor system 706 (configured as a head-mounted device) uses the one or more radar arrays to map the environment in an elevation direction 708 and an azimuth direction 710.

The radar array is able to detect the boundaries of the indoor space (e.g., the walls, floor, and ceiling) such that the virtual mapping of the physical environment reflects those boundaries. In this manner, the virtual mapping is configured such that the user 704 interacts with virtual elements so that he or she never physically runs into a wall of the three-dimensional environment 702. The radar array is also able to identify and map stationary objects such as couch 712 such that the boundaries of the couch (i.e., also referred to as a landmark) are also embedded into the virtual mapping of the environment. Both the boundaries and landmarks are used as anchors for the virtual and/or augmented world in which the user is operating the active sensor system 706. An object, like couch 712, is identified as a landmark, or additional boundary, when it appears in the same location in multiple frames captured by the active sensor system. Frames can be captured at different times and from different angles.

Figure 8:
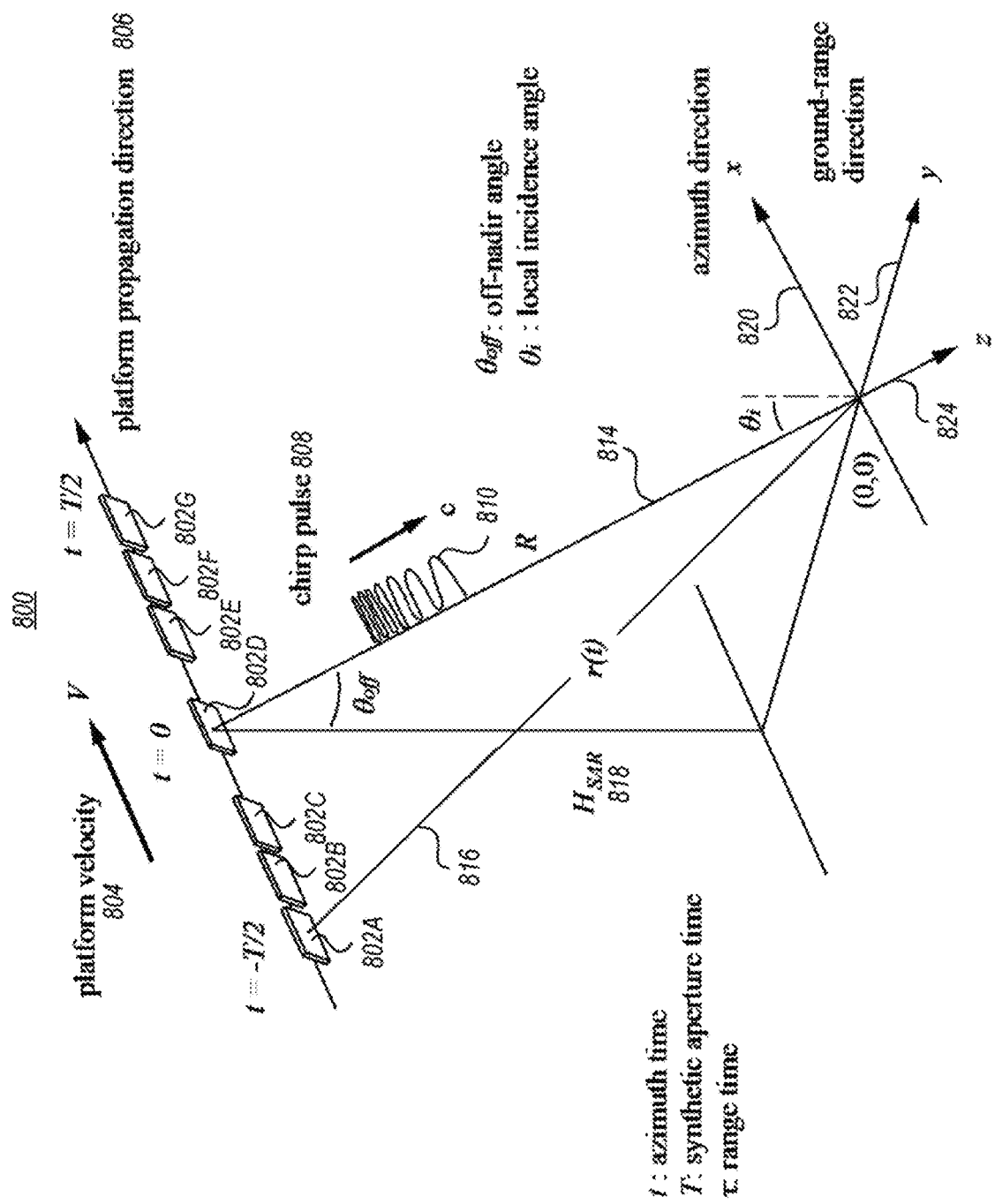
FIG. 8 illustrates an example embodiment of how an active sensor system is able to virtually increase its aperture size through progressive synthetic aperture radar techniques.

Attention will now be directed to FIG. 8, which illustrates an example embodiment of how an active sensor system, more particularly the radar array 802, is able to virtually increase its aperture size through progressive synthetic aperture radar operation. In these embodiments, the radar array 802 transmits one or more signals (e.g., chirp pulse 808, signal 810) to a particular voxel (e.g., located at coordinates (0,0)) and in such a manner that the one or more signals are reflected from one or more reflectors simulated to be located within the particular voxel, wherein the signals are reflected back to the radar array 802 as one or more reflected signals.

The radar array 802 is configured to transmit the one or more signals from a plurality of monostatic transmitters in a relatively directional signal transmission area (e.g., in the direction of line R) with a directionality towards a front of the active sensor system if configured as a head-mounted device, towards the particular voxel that is located within a certain distance of the radar array.

The radar array 802 is also configured receive and detect the one or more reflected signals 814 reflected back from the one or more reflectors simulated at the particular voxel location. The one or more reflected signals 814 is/are received and detected by one or more receivers of the radar array 802D at time=0. The radar array 200 is then able to calculate/determine the reflectivity of any objects located at the particular voxel to the active sensor system based on the one or more originating signals within the signal transmission area and the one or more reflected signals 814. Referring briefly back to FIG. 7, the one or more signals transmitted by the transmitters of the radar array are transmitted within a signal transmission area (e.g., elevation and/or azimuth direction) based on one or more particular movements of the active sensor system (e.g., head movements).

It should be appreciated that the signals (e.g., chirp pulse 808) that are generated and transmitted by the radar array as illustrated in FIG. 8 are tunable depending on the size of voxel, the distance between one or more objects in the environment and the active sensor system, and the reflectivity of one or more objects in the environment. For example, the signal ranges from about 60 GHz to about 100 GHz, or more broadly, between 24 GHz to about 110 GHz. In particular, 60 GHz is an appropriate radio frequency because it maintains signal power through short ranges, such as an arm's length for a user (e.g., between 0.1 to 1.1 meters). 60 GHz is also usable for longer ranges, up to approximately 4 meters. Increasing the radio frequency (e.g., 110 GHz) allows the simulated reflectors to be smaller, like a ping pong ball size for the plurality of reflectors. These frequencies and respective voxel sizes allow the active sensor system to obtain sub-millimeter and sub-radian tracking accuracy for object resolution in both the azimuth and elevation directions.

The radar array 802 moves in a particular direction (e.g., platform propagation direction 806) at a certain velocity (e.g., platform velocity 804). In some embodiments, the platform is an active sensor system and/or head-mounted device as described herein according to various embodiments. Radar array 802A is located at a particular location along the platform propagation direction 806 at t=−T/2 (where "t" is the azimuth time and "T" is the synthetic aperture time). Radar array 802B and radar array 802C are located at locations further along the radar array's trajectory at particular time intervals. At t=0, radar array 802D is located relative to the target voxel location at (0,0) at a particular off-nadir angle. In FIG. 8, radar array 802 is shown travelling in a generally azimuthal (x) direction; however, it should be appreciated that the radar array 802 is moveable in any linear and/or non-linear direction.

Based on previous and current location and velocity data, the radar array 802 (e.g., radar array 802E, radar array 802F, radar array 802G) is predicted to be located even further along the azimuth direction until reaching t=T/2. Reflected signals are received at each time stamp (e.g., reflected signal 816 at t=−T/2 and reflected signal R at t=0). For the signal processing to achieve the desired angular and range resolution, the trajectory of the radar array 802 must be known. The trajectory can be tracked and then predicted using the active sensor system, including IMU data and other tracking data. As the radar array moves, the aperture of the radar array is synthetically increased (i.e., synthetic aperture radar).

Attention will now be directed to FIGS. 9A-9D, which illustrate various views of different example embodiments of a mapping a three-dimensional space in various voxel configurations based on detected movements of an active sensor system. Disclosed embodiments for the active sensor system are configured to split the entire three-dimensional environment into a plurality of dimensional voxels.

Each voxel represents a potential or simulated reflector. The system then fixes a transmitted waveform along with the corresponding received waveform. For each voxel, the system computes the signal the system would receive if a reflector was located at the target voxel. The transmitted waveform is fixed along the corresponding received waveform for all waveforms being transmitted and all voxels. the signal is computed for each combination of waveform and voxel that is desired. For each voxel, the system also computes the correlation between an overall reflected signal and the reflected signal at the particular voxel location, and summed over an overall reflectivity value, in order to determine the reflectivity of the particular voxel.

Figure 9C:
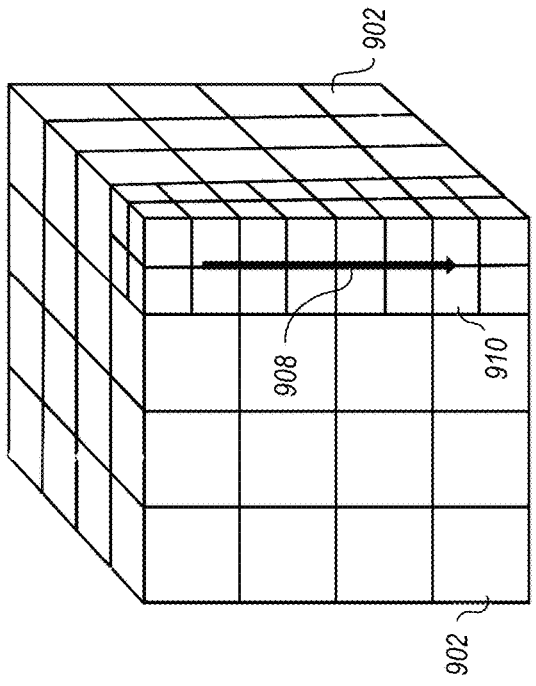
FIGS. 9A-9D illustrate various views of different example embodiments of a mapping a three-dimensional space in various voxel configurations based on detected movements of an active sensor system.
Figure 9D:
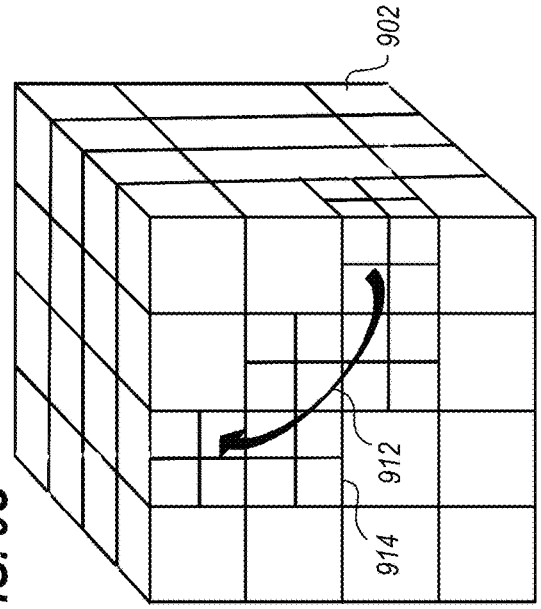
Figure 9A:
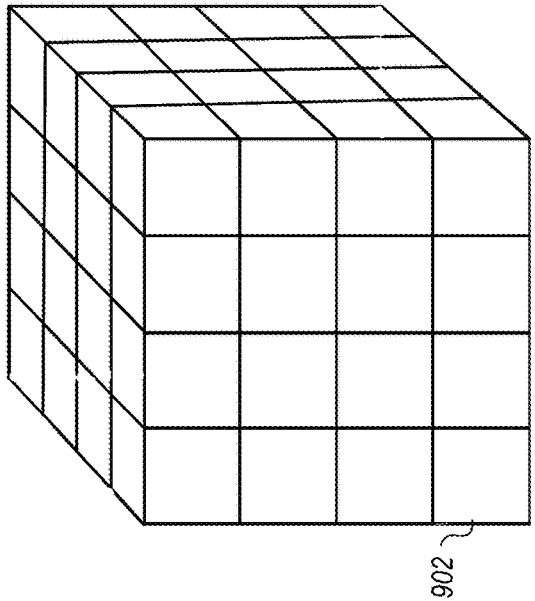

As shown in FIG. 9A, the environment (e.g., environment 700 of FIG. 7) is initially split into a first plurality of voxels, wherein the reflectivity is calculated for each voxel. The first plurality of voxels comprises voxels of equal size and at a default granularity (e.g., voxel 902). In some embodiments, the plurality of voxels comprises voxels of different sizes. For example, different portions (or subsets of voxels) of the environment comprise different sizes based on characteristics of the radar movements corresponding to the different portions of the environment. In some instances, the entire environment is updated to a new granularity, while in other instances, only some particular voxels are updated to a new granularity.

Figure 9B:
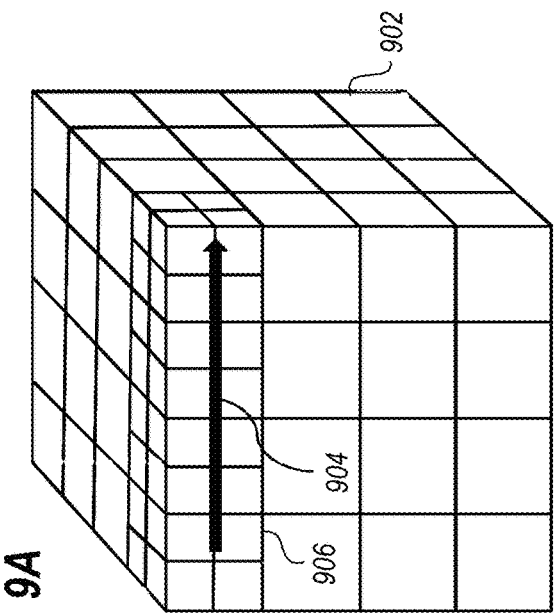

As shown in FIG. 9B, as the radar array is moved through various portions of the environment via random head movements (e.g., in the direction 904), the granularity of the voxels disposed in view of the radar array along its moving path is increased. The higher granularity of the voxels, the smaller the individual size of each voxel. As shown in FIG. 9B, only a portion of the environment is updated to reflect the new voxel granularity (e.g., voxel 906), while other portions remain at the default granularity (e.g., voxel 902). The new voxel granularity is shown as a 4:1 ratio (e.g., 2×2 set of new voxels replaces a single default voxel). However, it should be appreciated that the new voxel granularity is configurable as any ratio, including 2:1, 6:1, 9:1, 27:1, or any other granularity.

In some instances, the determination of which voxels are to be repartitioned with new granularity is based on the detected movements of the radar array, and so as to correspond with areas of the environment where the radar array reflects new focus and/or attention from a user and/or directionality of the mapping system.

Thus, improvement in the mapping of the environment would be seen in a single direction (e.g., direction 904), corresponding to detection directional movement of the mapping/tracking system. As illustrated, when a particular radar movement is detected, only a single row of default size voxels is updated, in a directionality of the radar movement. In some instances, multiple rows of voxels are updated, or an entire plane of voxels (every row of a particular face of the environment), or the entire environment is updated by rows. Additionally, or alternatively, only a portion of a row is updated (e.g., only some of the voxels of the row).

Similar to FIG. 9B, as the radar is moved through various portions of the environment via random head movements (e.g., in the direction 908), the granularity of voxels disposed in view of the radar array along its moving path is increased. Thus, a portion of the voxels are updated to reflect a new granularity (e.g., voxel 910), while the rest of the environment remains in the default or previous granularity (e.g., voxel 902). Thus, improvement in the mapping of the environment would be seen in a single direction (e.g., direction 908). As illustrated, a single column of voxels is updated to the new granularity. Similar to the voxel update by row, parts of the environment can be updated by column by column, a few rows simultaneously, or an entire plane of the environment can be updated. Furthermore, only some of the voxels of a particular column could be updated.

It should be appreciated that the radar array may move in both linear and non-linear directions. As shown in FIG. 9D, when the radar array is moved in a non-linear direction (e.g., direction 912), voxels in both the azimuth and elevation directions are updated to reflect the new voxel granularity (e.g., voxel 914). Thus, the user would see improvement in the feature resolution of the virtual mapping of the environment in a more omni-directional view. Thus, the new granularity is applicable to any combination of rows and columns, including partial rows and partial columns, based on the detected head movement.

In some instances, the voxel granularity is updated in real-time as soon as the start of a radar movement is detected. In some instances, the voxel granularity is updated after an end of a particular radar movement is detected.

Additionally, in regard to any of the foregoing embodiments, the new voxel granularity that is selected may be a plurality of different new voxel granularities, such that the new voxel granularity is effectively irregular or variable throughout a particular range or region that is being processed/mapped with the new voxel granularity (ies). For instance, while not shown, a first voxel can be repartitioned to a new voxel granularity of 4:1, while a neighboring voxel in a corresponding area of the environment that is being remapped can be repartitioned into a new voxel granularity of 6:1, or another different granularity.

As mentioned before, the size of the voxel will depend on and corresponding directly with, in some instances, the relative amount of movement and/or the type of movement that is detected of the radar array, including direction and speed. As the voxel granularity is increased (i.e., voxel size is decreased), for example, the active sensor system is able to resolve features of the user's environment with increasing accuracy and increasing angular and range resolution. The smaller the voxel size, the finer the resolution of the environment in its 2D and subsequent 3D mapping.

The system is also beneficially configured to reserve power and increase efficiency. For example, if the radar array is moved through part of the environment that has already been resolved/mapped, the system determines if a finer voxel granularity is available based on the detected movement.

Next the system determines if the finer voxel granularity will provide an improved mapping of the environment, thereby improving the user's experience and operation of the mixed-reality system within the environment. For example, if a new object is detected that was previously undetected or a new object has entered the environment, the system is configured to determine that updating the voxel granularity and recalculating the reflectivity values for the updated voxels is valuable. Furthermore, if the system identified one or more previously mapped objects that overlapped or were partially unresolved, the system is configured to determine that updating the voxel granularity and performing subsequent steps is valuable to the user.

Thus, as the radar array is moved about, the system iteratively determines whether or not to increase the granularity of the voxels for the mapping/remapping processes. In some embodiments, as the radar array is moving, the voxels appear to be multiplying within themselves while the features of the environment are better resolved over time.

In some embodiments, the virtual mapping of the environment is shared between two or more users operating their own mixed-reality system within the same environment. In this manner, the combined radar movements allow the active sensor system to more quickly map the entire environment. Furthermore, if the system determines that a portion of the environment is optimally resolved, when the radar array is moved in the direction of that portion, the system conserves power and does not transmit signals for a pre-determined time.

Figure 10:
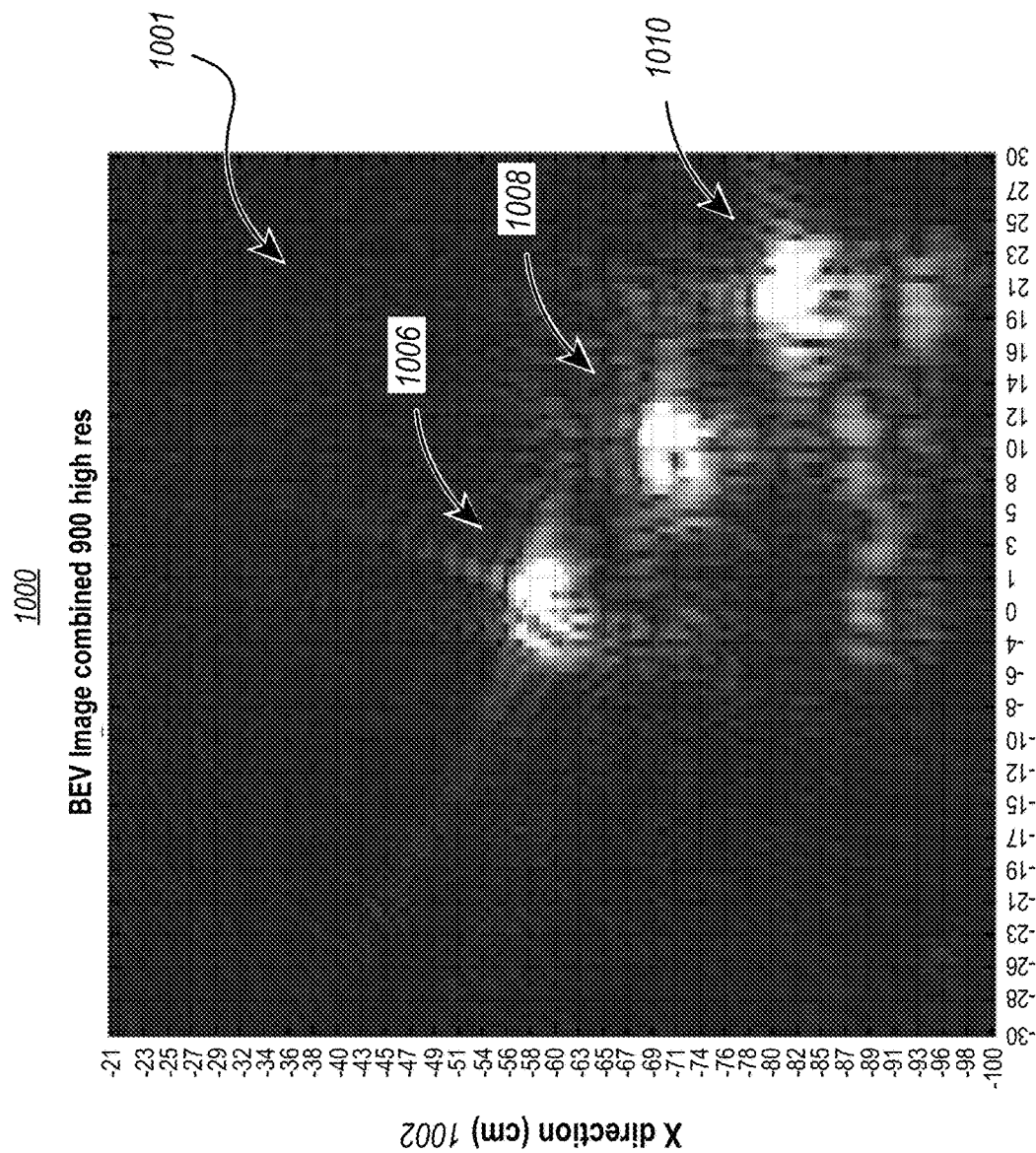
FIG. 10 illustrates an example embodiment of a two-dimensional cross-section map of a larger three-dimensional environment, wherein a plurality of objects is resolved from each other.

Attention will now be directed to FIG. 10, which illustrates an example embodiment of a two-dimensional cross-section map of a larger three-dimensional environment, wherein a plurality of objects is resolved from each other. After the active sensor system, configured according to disclosed embodiments, has completed a scan at a particular elevation of a horizontal cross-section (e.g., X-Y plot having an x direction 1002 and a y direction 1004 coordinates axes) of the three-dimensional environment, a reflectivity image is generated illustrating one or more peaks that correspond to one or more objects detected in the three-dimensional environment.

For example, reflectivity image 1000 is shown having a first peak 1006, a second peak 1008, and a third peak 1010. The plurality of peaks is contrasted against the dark space 1001. In this particular image, the first peak 1006 corresponds to a first object existing in the physical environment, the second peak 1008 corresponds a second object existing in the physical environment, and the third peak 1010 corresponds to a third object existing in the physical environment. The active sensor system, using one or more radar arrays, is able to resolve the plurality of objects (e.g., distinguish the objects from each other) where the objects are millimeters to centimeters apart from each other. The dark space 1001 corresponds to space in the three-dimensional environment that is likely empty space.

Figure 11C:
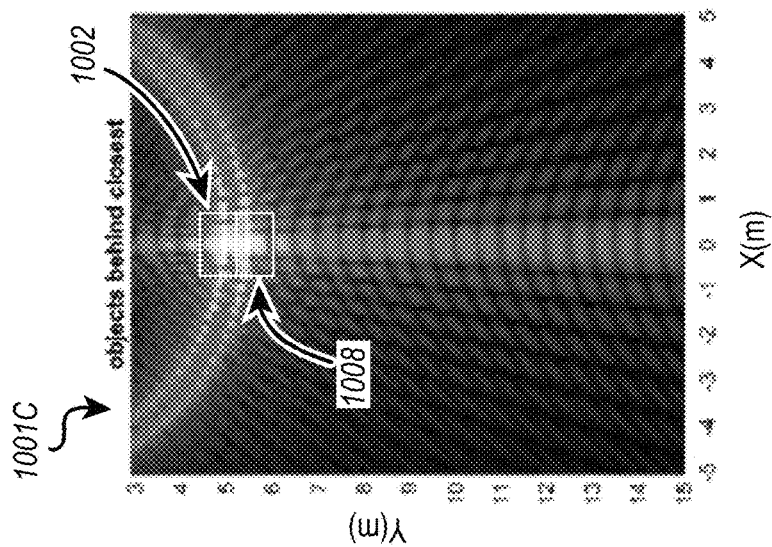
FIGS. 11A-11C illustrate an example embodiment of removing an artifact occurring in a two-dimensional cross section map of a larger three-dimensional environment.
Figure 11B:
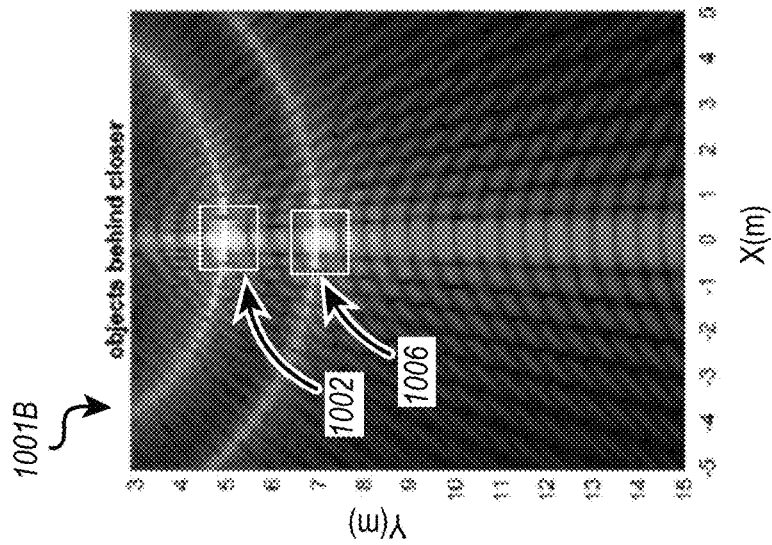
Figure 11A:
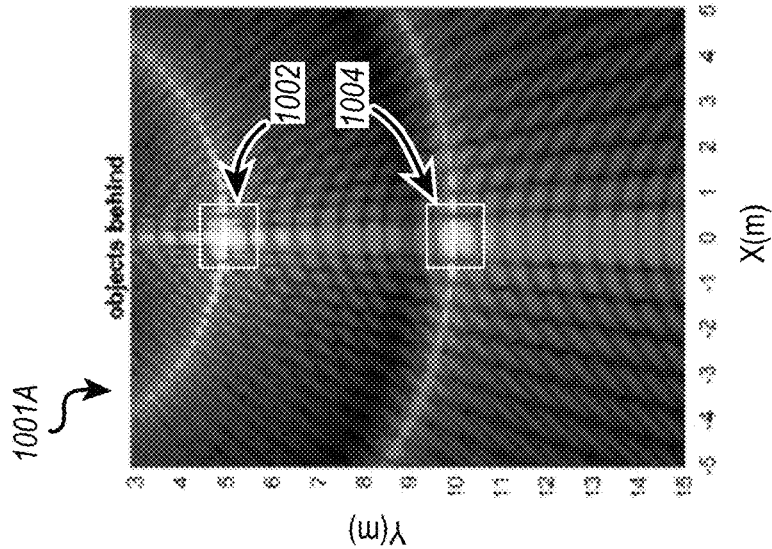

FIGS. 11A-11C illustrate an example embodiment of removing an artifact occurring in a two-dimensional cross section map of a larger three-dimensional environment. For each voxel simulated to be centered around a point in the three-dimensional space, a first reflectivity image map 1101A (see FIG. 11A) is collected at a first time and/or first angle and a second reflectivity image map 1101B (see FIG. 11B) is collected at a second time different than the first time and/or second angle different from the second angle. One or more additional reflectivity image maps 1101C (e.g., see FIG. 11C) are also collected over time during the mapping process.

A comparison of the plurality of reflectivity image maps is then performed, comparing each reflectivity map against each other reflectivity map in the plurality of reflectivity maps. This comparison is performed to identify objects that persist in a same location (e.g., object 1102) in each of the reflectivity maps and objects that appear to be moving or disappearing and then reappearing (e.g., object 1104, object 1106, and object 1108), based on the comparison of the maps and the identified objects/elements in each of the maps. In some instances, the system is able to determine that the object is an artifact and not just an object moving in time, particularly if the reflectivity maps are close enough in time intervals such that the object would be moving in a discontinuous manner.

In some instances, the plurality of reflectivity maps are combined and/or have their reflectivity values summed together, such that the reflectivity values are compounded (i.e., brighter areas become brighter when added with bright areas/darker areas become darker when added with dark areas/and some bright areas become darker when added with dark areas). In other words, a computing system computes the correlation between the one or more reflectivity image maps. The system is also able to calculate the reflectivity of a particular voxel as compared to the entire environment. Thus, the system is then able to estimate which reflectivity peaks are likely real and which peaks are likely side lobes. Thus, by correlating a frame with its previous counterparts, the system is able to identify non-correlating peaks.

Several factors contribute to an object's reflectivity and subsequent peak measurement. For example, the larger the object, the larger the reflectivity value. For example, an average human body typically has (as viewed from a signal receiver) about a one square meter cross section. Along with the size of the object, the shape of the object and the material of which the object is made also contributes to the radar cross section.

Reflectivity peaks that are determined to likely be real and also stationary over time may be identified and used as landmarks within the virtual mapping of the three-dimensional space. As described above, landmarks are configured to help the active sensor system with head tracking within the actual environment and corresponding virtual environment in which the user is operating the mixed-reality system. This process of identifying and excluding artifacts is beneficially configured to consume low computing power, is a relatively quick process requiring low computer memory, and yields high accuracy results for false negative detection.

Methods

Figure 12:
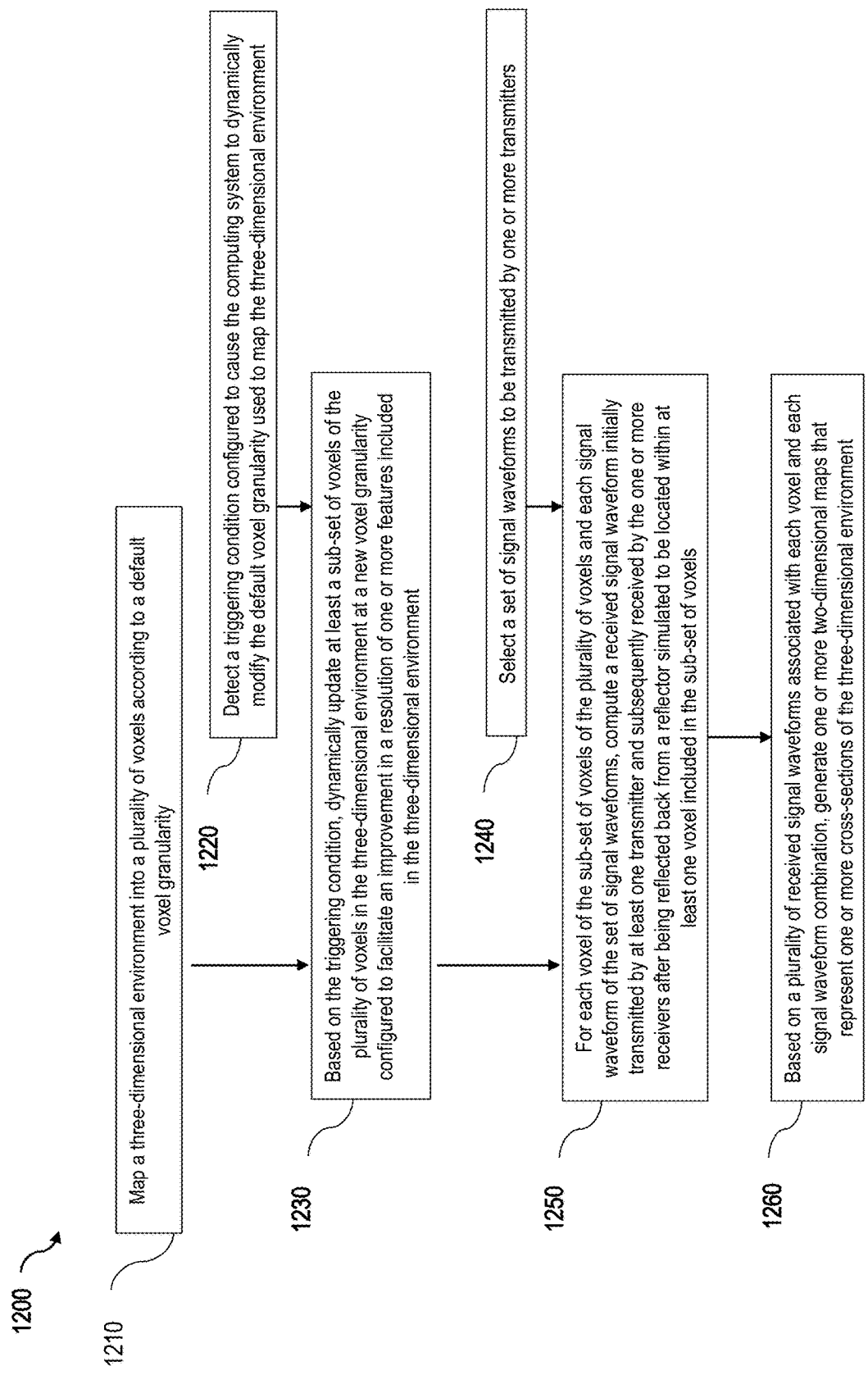
FIG. 12 illustrates a process flow diagram comprising a plurality of acts associated with a method for generating a two-dimensional map that represents a three-dimensional space based on dynamically mapping the three-dimensional according to progressive voxel configurations based on detected movement of a radar array.
Figure 13:
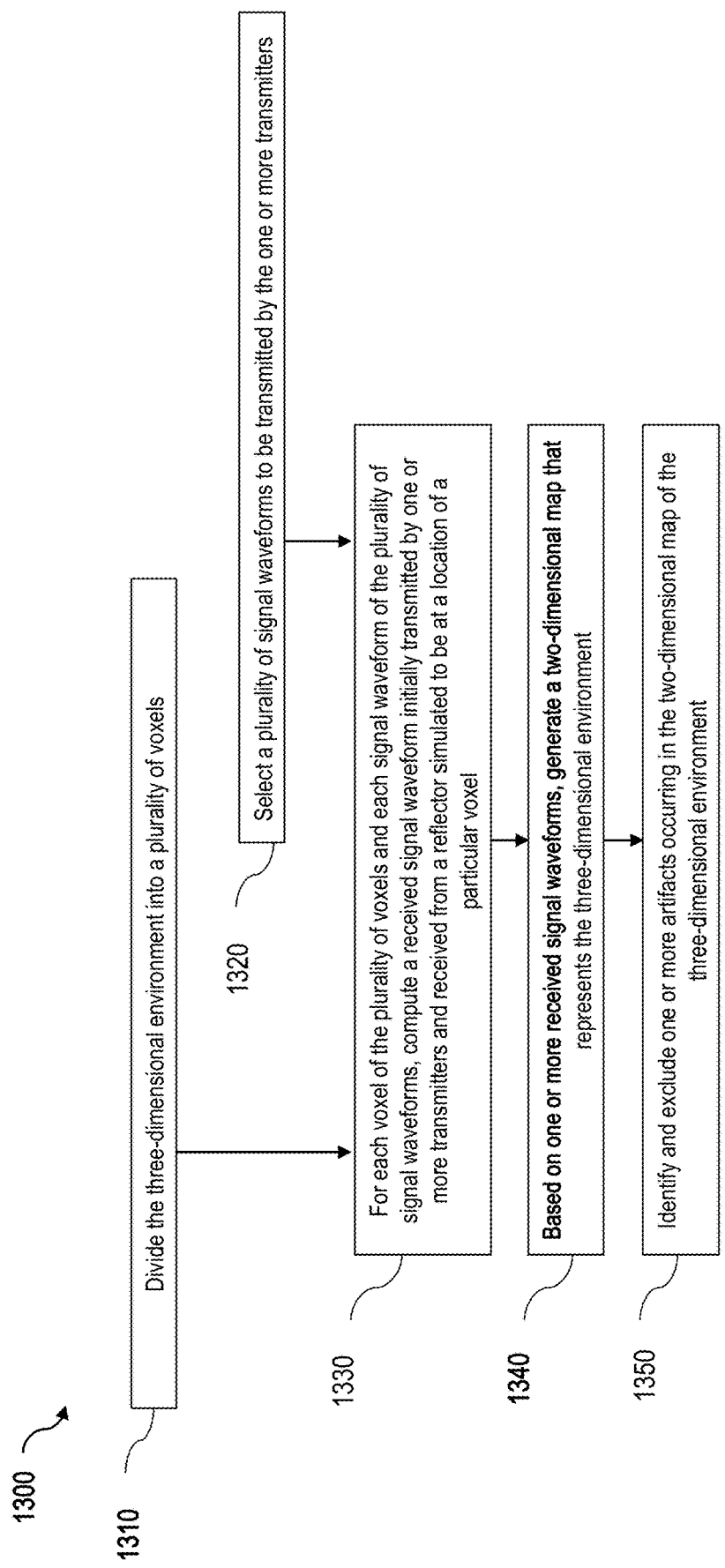
FIG. 13 illustrates a process flow diagram comprising a plurality of acts associated with a method for excluding one or more artifacts from a two-dimensional map representing a cross section of a three-dimensional environment.
Figure 14:
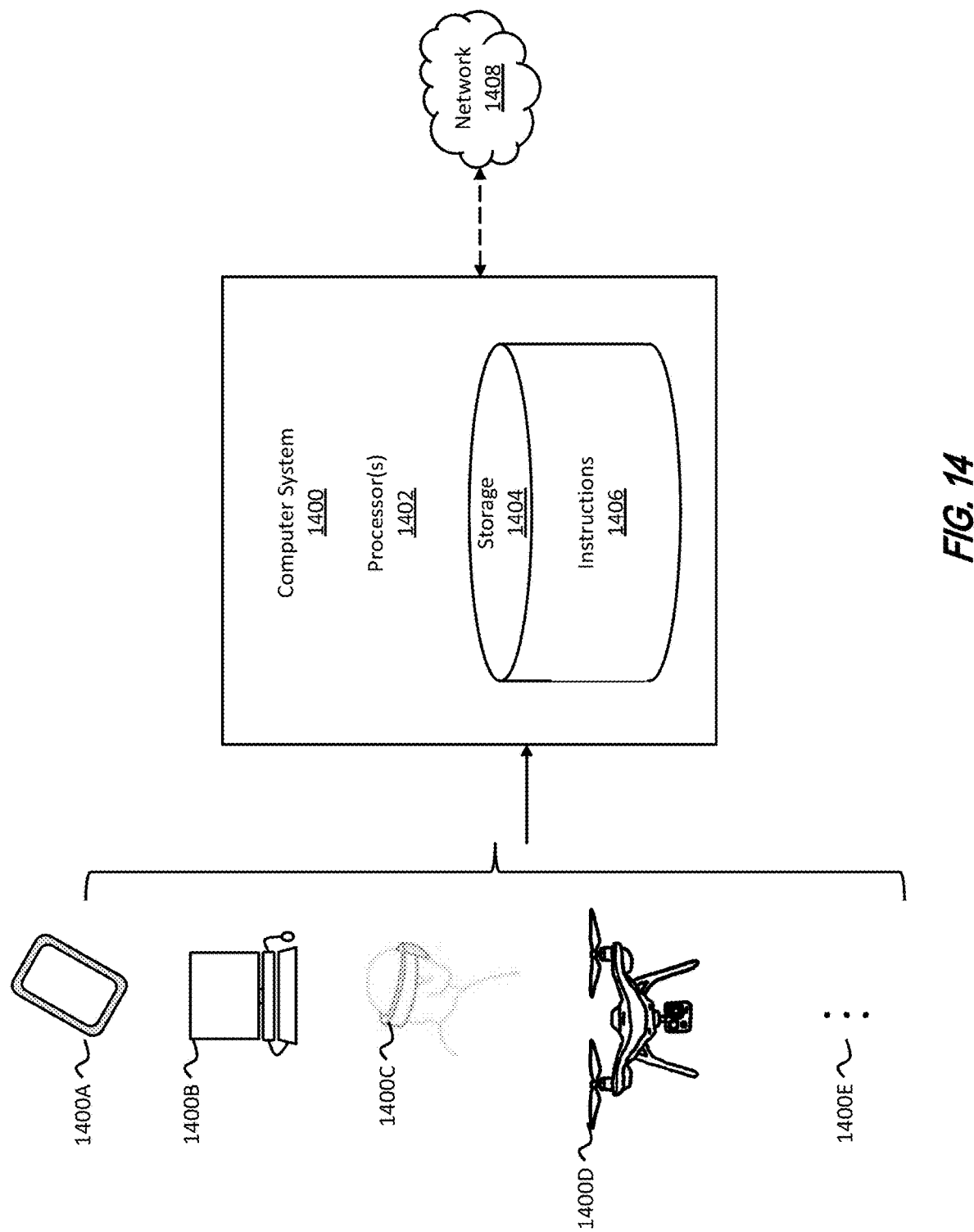
FIG. 14 illustrates an example architecture that includes a computing system that is capable of being utilized to implement the disclosed embodiments.

Attention will now be directed to FIGS. 12-14, which illustrate various example embodiments of methods for performing disclosed embodiments. Although the method acts may be discussed in a certain order or illustrated in a flow chart as occurring in a particular order, no ordering is required unless specifically stated, or required because an act is dependent on another act being completed prior to the act being performed.

Attention will now be directed to FIG. 12, which illustrates a process flow diagram comprising a plurality of acts associated with a method for generating a two-dimensional map that represents a three-dimensional space based on dynamically mapping the three-dimensional according to progressive voxel configurations based on detected movement of a radar array.

FIG. 12, in some reference to FIG. 1, illustrates a flow diagram 1200 that includes various acts (act 1210, act 1220, and act 1230) associated with exemplary methods that can be implemented by computer system 1400 (see FIG. 14) for virtually mapping a three-dimensional environment. For example, disclosed systems are configured to map a three-dimensional environment into a plurality of voxels according to a default voxel granularity (act 1210) and for detect a triggering condition configured to cause the computing system to dynamically modify the default voxel granularity used to map the three-dimensional environment (act 1220).

Based on the triggering condition, systems dynamically update at least a sub-set of voxels of the plurality of voxels in the three-dimensional environment at a new voxel granularity configured to facilitate an improvement in a resolution of one or more features included in the three-dimensional environment (act 1230).

A set of signal waveforms to be transmitted by one or more transmitters is also selected (act 1240). Then, for each voxel of the sub-set of voxels of the plurality of voxels and each signal waveform of the set of signal waveforms, the systems compute a received signal waveform initially transmitted by at least one transmitter and subsequently received by the one or more receivers after being reflected back from a reflector simulated to be located within at least one voxel included in the sub-set of voxels (act 1250).

Additionally, based on a plurality of received signal waveforms associated with each voxel and each signal waveform combination, one or more two-dimensional maps that represent one or more cross-sections of the three-dimensional environment are generated (act 1260).

To further improve the quality of the two-dimensional maps, and subsequently the quality of the three-dimensional map, the computing system is also configured to identify and exclude one or more artifacts occurring in the one or more two-dimensional maps of the three-dimensional environment. The identification of artifacts to be excluded can be based on an analysis and identification of non-correlating elements within different frames of a same area of the three-dimensional environment. In this manner, the three-dimensional map of the environment is more likely to render only those objects that actually exist in the environment.

As referenced above, the systems are configured to perform different mapping processes in response to detecting certain triggering conditions. These triggering conditions correspond with a desire or need for a new or update map of an environment and cause at least the referenced processes associated with selecting/changing the voxel granularity used to perform the referenced mapping of an environment.

In some instances, the systems are configured to identify and distinguish between different types and magnitudes of triggering conditions. For example, one triggering condition is the detectable movement of the one or more radar arrays within an unmapped or a previously mapped environment. In such instances, the system is configured to determine when the movement is of a type and magnitude that meets or exceeds a predetermined condition for triggering the selection of a new voxel granularity (different than a default granularity). In some instances, the selection of the new voxel granularity is dynamically determined and selected in response to the detected movement and relatively based on a particular velocity associated with the detected movement of the one or more radar arrays.

In some instances, the triggering condition is a detectable change in a lighting condition of the three-dimensional environment. In these instances, one or more two-dimensional maps are generated from the system (using voxel granularities associated with the detected lighting conditions).

In some embodiments, these new maps are used to augment data provided to an image-based mapping system for mapping the three-dimensional environment, but which may perform poorly in low-light conditions, for example.

A triggering condition for performing any of the different mapping processes (e.g., generating or updating a map and/or selection of a new voxel granularity) can also include the identification of a new or moved object in a particular three-dimensional environment. This identification of a new or moving/moved object can come from an image tracking sensor or any other sensor data that is capable of reflecting movement of an object.

The disclosed systems are also configured to detect a new condition that cause the system to refrain from updating any voxels corresponding to the new triggering condition according to the particular voxel granularity. The new condition can include any of the foregoing triggering conditions that are determined to fail to reach a sufficient predetermined value for triggering the selection of a new voxel granularity. Additionally, or alternatively, the one or more additional conditions that cause the system to refrain from updating any voxels/voxel granularity is a detected condition that the system determines corresponds to a particular sub-set of voxels have already been mapped at a desired, threshold and/or optimal resolution.

To assist in the virtual mapping processes, the one or more computer-executable instructions are also further executable by the one or more processors to further configure the computing system to identify one or more boundaries of the three-dimensional environment, wherein the one or more boundaries are embedded into the one or more two-dimensional maps. In this manner, a user operating the mixed-reality system will not come into contact with the physical barriers of the environment because the virtual environment will reflect those boundaries and will guide the user away from the boundaries as part of the game or experience that the user has selected to view through the mixed-reality headset.

Where multiple users are interacting with the same three-dimensional environment and at least one radar array is associated with a different user and is moved independently from any other radar array, different areas of the three-dimensional environment can be mapped simultaneously. For simultaneous and/or supplemental mapping, at least one two-dimensional map can be augmented using mapping data obtained from the different user using the at least one radar array.

Attention will now be directed to FIG. 13, which illustrates a process flow diagram comprising a plurality of acts associated with a method for excluding one or more artifacts from a two-dimensional map representing a cross section of a three-dimensional environment.

FIG. 13 illustrates a flow diagram 1300 that includes various acts (act 1310, act 1320, and act 1330) associated with exemplary methods that can be implemented by computer system 1400 (see FIG. 14) having a user wearable device comprising a first radar array configured to perform elevation mapping of a three-dimensional environment and a second radar array configured to perform azimuthal mapping of the three-dimensional environment, wherein each radar array comprises one or more transmitters configured to transmit a signal and one or more receivers configured to receive the signal transmitted by the one or more transmitters.

As illustrated, the computing system first divides the three-dimensional environment into a plurality of voxels (act 1310) and also selects a plurality of signal waveforms to be transmitted by the one or more transmitters (1320).

Then, for each voxel of the plurality of voxels and each signal waveform of the plurality of signal waveforms, a received signal waveform is computed (act 1330). In some instances, the received signal waveform is initially transmitted by one or more transmitters and received from a reflector simulated to be at a location of a particular voxel. Then, based on one or more received signal waveforms, the computing system generates a two-dimensional map that represents the three-dimensional environment (act 1340) and identifies and excludes one or more artifacts occurring in the two-dimensional map of the three-dimensional environment (act 1350).

In some instances, the user wearable device is configured as a head-mounted device (HMD). However, as previously mentioned, the wearable device can also be configured as other types of products and even handheld products.

In some instances, the computing system is further configured to create one or more landmarks within the three-dimensional environment that are used by a head tracking system in an HMD, such as an image-based head tracking system for example, and/or to provide tracking data to other device tracking systems to facilitate tracking of wearable-type device(s) that incorporate the tracking systems.

In some instances, different two-dimensional maps generated by the system and/or by a plurality of different systems are combinable into a composite virtual three-dimensional map which is adapted for use with a mixed-reality system in which a user interacts within the three-dimensional environment according to the virtual three-dimensional map.

In view of the foregoing, it will be appreciated that the disclosed embodiments provide many technical benefits over conventional systems and methods for mapping a three-dimensional environment using dynamically updated voxel configurations configured to synthetically increase an effective radar aperture of mapping/imaging systems.

Example Computer/Computer Systems

Attention will now be directed to FIG. 14 which illustrates an example computer system 1400 that may include and/or be used to perform any of the operations described herein. Computer system 1400 may take various different forms. For example, computer system 1400 may be embodied as a tablet 1400A, a desktop or a laptop 1400B, a wearable device (e.g., head-mounted device 1400C), a drone 1400D, vehicle or other mobile device (e.g., the active sensor system is able to be moved and guided through a space), a beacon (e.g., the active sensor system is external to a mixed-reality headset), a mixed-reality system device, and/or any other device, as illustrated by the ellipsis 1400E.

Computer system 1400 may also be configured as a standalone device or, alternatively, as a distributed system that includes one or more connected computing components/devices that are in communication with computer system 1400.

In its most basic configuration, computer system 1400 includes various different components. FIG. 14 shows that computer system 1400 includes one or more processor(s) 1402 (aka a "hardware processing unit") and storage 1404.

Regarding the processor(s) 1402, it will be appreciated that the functionality described herein can be performed, at least in part, by one or more hardware logic components (e.g., the processor(s) 1402). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1400. The different components, modules, engines, and services described herein may be implemented as objects or processors that execute on computer system 1400 (e.g., as separate threads).

Storage 1404 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1404 is shown as including executable instructions 1406. The executable instructions 1406 represent instructions that are executable by the processor(s) 1402 of computer system 1400 to perform the disclosed operations, such as those described in the various methods.

The disclosed embodiments may comprise or utilize a special-purpose or general-purpose computer including computer hardware, such as, for example, one or more processors (such as processor(s) 1402) and system memory (such as storage 1404), as discussed in greater detail below. Embodiments also include physical and other computer-readable media for carrying or storing computer-executable instructions and/or data structures. Such computer-readable media can be any available media that can be accessed by a general-purpose or special-purpose computer system.

Computer-readable media that store computer-executable instructions in the form of data are physical or hardware computer storage media or device(s). Computer-readable media that merely carry computer-executable instructions are transitory media or transmission media. Thus, by way of example and not limitation, the current embodiments can comprise at least two distinctly different kinds of computer-readable media: (1) computer-readable hardware storage media and (2) transitory transmission media that does not include hardware storage.

The referenced computer storage device(s) (aka "hardware storage device(s)") comprise hardware storage components/devices, such as RAM, ROM, EEPROM, CD-ROM, solid state drives ("SSD") that are physical and tangible and that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer and which are distinguished from mere carrier waves and signals.

Computer system 1400 may also be connected (via a wired or wireless connection) to external sensors (e.g., one or more remote cameras) or devices via a network 1408. For example, computer system 1400 can communicate with any number devices or cloud services to obtain or process data. In some cases, network 1408 may itself be a cloud network. Furthermore, computer system 1400 may also be connected through one or more wired or wireless networks (e.g., network 1408) to remote/separate computer systems(s) that are configured to perform any of the processing described with regard to computer system 1400.

A "network," like network 1408, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1408. Transmission media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more radar arrays, each radar array comprising one or more transmitters and a plurality of receivers;
    one or more processors; and
    one or more hardware storage devices storing one or more computer-executable instructions that are executable by the one or more processors to configure the computing system to:
        map a three-dimensional environment into a plurality of voxels according to a default voxel size such that the three-dimensional environment is divided into the plurality of voxels where each voxel of the plurality of voxels comprises the default voxel size;
        detect at least one triggering condition configured to cause the computing system to dynamically modify the default voxel size used to map the three-dimensional environment, wherein the triggering condition comprises a detected movement of the one or more radar arrays;
        based on detecting the triggering condition, dynamically update at least a sub-set of voxels of the plurality of voxels in the map of the three-dimensional environment to a decreased voxel size such that the sub-set of voxels of the plurality of voxels in the map of the three-dimensional environment comprises the decreased voxel size, wherein dynamically updating at least the sub-set of voxels of the plurality of voxels in the map of the three-dimensional environment to the decreased voxel size comprises refraining from dynamically updating one or more remaining voxels of the plurality of voxels to the decreased voxel size such that, after dynamically updating at least the sub-set of voxels of the plurality of voxels in the map of the three-dimensional environment to the decreased voxel size, the plurality of voxels includes (i) the sub-set voxels comprising the decreased voxel size and (ii) the one or more remaining voxels comprising the default voxel size;
select a set of signal waveforms to be transmitted by one or more transmitters;
for each voxel of the sub-set of voxels of the plurality of voxels and each signal waveform of the set of signal waveforms, compute a received signal waveform initially transmitted by at least one transmitter and subsequently received by two or more receivers from the plurality of receivers after being reflected back from a reflector simulated to be located within at least one voxel included in the sub-set of voxels; and
based on a plurality of received signal waveforms associated with each voxel and each signal waveform combination, generate one or more two-dimensional maps that represent one or more cross-sections of the three-dimensional environment.

2. The computing system of claim 1, the one or more computer-executable instructions being further executable by the one or more processors to further configure the computing system to:
identify and exclude one or more artifacts occurring in the one or more two-dimensional maps of the three-dimensional environment.

3. The computing system of claim 2, wherein the one or more artifacts are identified based on the one or more artifacts failing to correlate between multiple frames of a same area of the three-dimensional environment.

4. The computing system of claim 1, the one or more computer-executable instructions being further executable by the one or more processors to further configure the computing system to:
based on a combination of one or more two-dimensional maps, generate a virtual three-dimensional map of the three-dimensional environment.

5. The computing system of claim 1, wherein the decreased voxel size is selected based on a particular velocity associated with the detected movement of the one or more radar arrays.

6. The computing system of claim 1, wherein the triggering condition further comprises a change in a lighting condition of the three-dimensional environment.

7. The computing system of claim 1, wherein the one or more two-dimensional maps are used to augment an image-based mapping system configured to map the three-dimensional environment.

8. The computing system of claim 7, wherein the triggering condition further comprises the computing system identifying at least one new or moved feature in the three-dimensional environment.

9. The computing system of claim 1, the one or more computer-executable instructions being further executable by the one or more processors to further configured the computing system to:
detect a new triggering condition configured to cause the computing system to update the sub-set of voxels of the plurality of voxels according to a particular voxel granularity;
identify one or more additional conditions associated with the sub-set of voxels; and
based on the one or more additional conditions associated with the sub-set of voxels, refrain from updating any voxels corresponding to the new triggering condition according to the particular voxel granularity.

10. The computing system of claim 9, wherein at least one of the one or more additional conditions is a condition that one or more environmental features corresponding to the sub-set of voxels associated with the new triggering condition have previously been mapped at an optimal resolution.

11. The computing system of claim 1, the one or more computer-executable instructions being further executable by the one or more processors to further configure the computing system to:
identify one or more boundaries of the three-dimensional environment, wherein the one or more boundaries are embedded into the one or more two-dimensional maps.

12. The computing system of claim 1, wherein at least one radar array is associated with a different user and is moved independently from any other radar array such that different areas of the three-dimensional environment are mapped simultaneously.

13. The computing system of claim 12, wherein at least one two-dimensional map is augmented using mapping data obtained from the different user using the at least one radar array.

14. A computing system comprising:
a user wearable device comprising a first radar array configured to perform elevation mapping of a three-dimensional environment and a second radar array configured to perform azimuthal mapping of the three-dimensional environment, each radar array comprising one or more transmitters configured to transmit a signal and a plurality of receivers configured to receive the signal transmitted by the one or more transmitters;
one or more processors; and
one or more hardware storage devices storing one or more computer-executable instructions that are executable by the one or more processors to configure the computing system to:
divide the three-dimensional environment into a plurality of voxels at a default voxel size where each voxel of the plurality of voxels comprises the default voxel size;
detect at least one triggering condition configured to cause the computing system to dynamically modify the default voxel size used to divide the three-dimensional environment, wherein the triggering condition comprises a detected movement of the first or second radar arrays;
based on detecting the triggering condition, dynamically update at least a sub-set of voxels of the plurality of voxels dividing the three-dimensional environment to a new voxel size such that the sub-set of voxels of the plurality of voxels dividing the three-dimensional environment comprises the new voxel size, wherein dynamically updating at least the sub-set of voxels of the plurality of voxels in the map of the three-dimensional environment to the new voxel size comprises refraining from dynamically updating one or more remaining voxels of the plurality of voxels to the new voxel size such that, after dynamically updating at least the sub-set of voxels of the plurality of voxels in the map of the three-dimensional environment to the new voxel size, the plurality of voxels includes (i) the sub-set voxels comprising the new voxel size and (ii) the one or more remaining voxels comprising the default voxel size;
select a plurality of signal waveforms to be transmitted by the one or more transmitters;
for each voxel of the plurality of voxels and each signal waveform of the plurality of signal waveforms, compute a received signal waveform initially transmitted by one or more transmitters and received from a reflector simulated to be at a location of a particular voxel by two or more receivers from the plurality of receivers;

based on one or more received signal waveforms, generate a two-dimensional map that represents the three-dimensional environment; and identify and exclude one or more artifacts occurring in the two-dimensional map of the three-dimensional environment.

15. The computing system of claim 14, wherein the user wearable device is configured as a head-mounted device (HMD).

16. The computing system of claim 15, the one or more computer-executable instructions being further executable by the one or more processors to further configure the computing system to:

create one or more landmarks within the three-dimensional environment that are used by a head tracking system in the HMD.

17. The computing system of claim 16, wherein the head tracking system is configured as an image-based head tracking system.

18. A computing system comprising:

a user wearable device comprising a first radar array configured to perform elevation mapping of a three-dimensional environment and a second radar array configured to perform azimuthal mapping of the three-dimensional environment, each radar array comprising one or more transmitters configured to transmit a signal and a plurality of receivers configured to receive the signal transmitted by the one or more transmitters;

one or more processors; and one or more hardware storage devices storing one or more computer-executable instructions that are executable by the one or more processors to configure the computing system to:

map a three-dimensional environment into a plurality of voxels according to a default voxel size such that the three-dimensional environment is divided into the plurality of voxels where each voxel of the plurality of voxels comprises the default voxel size;

detect at least one triggering condition configured to cause the computing system to dynamically modify the default voxel size used to map the three-dimensional environment, wherein the triggering condition comprises a detected movement of the first and second radar arrays;

based on detecting the triggering condition, dynamically update at least a sub-set of voxels of the plurality of voxels in the map of the three-dimensional environment to a decreased voxel size such that the sub-set of voxels of the plurality of voxels in the map of the three-dimensional environment comprises the decreased voxel size, wherein dynamically updating at least the sub-set of voxels of the plurality of voxels in the map of the three-dimensional environment to the decreased voxel size comprises refraining from dynamically updating one or more remaining voxels of the plurality of voxels to the decreased voxel size such that, after dynamically updating at least the sub-set of voxels of the plurality of voxels in the map of the three-dimensional environment to the decreased voxel size, the plurality of voxels includes (i) the sub-set voxels comprising the decreased voxel size and (ii) the one or more remaining voxels comprising the default voxel size;

select a set of signal waveforms to be transmitted by one or more transmitters;

for each voxel of the sub-set of voxels of the plurality of voxels and each signal waveform of the set of signal waveforms, compute a received signal waveform initially transmitted by at least one transmitter and subsequently received by the one or more receivers from the plurality of receivers after being reflected back from a reflector simulated to be located within at least one voxel included in the sub-set of voxels; and based on a plurality of received signal waveforms associated with each voxel and each signal waveform combination, generate one or more two-dimensional maps that represent one or more cross-sections of the three-dimensional environment.

19. The computing system of claim 18, wherein the one or more two-dimensional maps are combined into a virtual three-dimensional map is adapted associated with a mixed-reality system in which a user interacts within the three-dimensional environment according to the virtual three-dimensional map.

* * * * *